United States Patent [19]

Johnson et al.

[11] 3,863,161

[45] Jan. 28, 1975

[54] DIGITAL METHOD AND APPARATUS FOR DYNAMICALLY MONITORING THE FREQUENCY OF A FREQUENCY VARYING SIGNAL

[75] Inventors: Frederick W. Johnson; Dale W. Trent, both of Richardson, Tex.; Raymond P. Escoffier, Charlottesville, Va.

[73] Assignee: Rockwell International Corporation, Dallas, Tex.

[22] Filed: Nov. 28, 1973

[21] Appl. No.: 420,197

[52] U.S. Cl. .................... 328/140, 178/88, 307/233, 324/77 B, 325/316, 329/110

[51] Int. Cl. .................... H03b 3/08

[58] Field of Search .................... 329/110, 112, 104; 328/116, 117, 140; 325/316, 324, 345, 333, 465, 474, 320, 321; 178/88; 324/77 B, 77 BC, 77 C, 77 E, 77 F, 77 G, 77 H, 77 J, 77 K

[56] References Cited

UNITED STATES PATENTS

| | | | |
|---|---|---|---|
| 2,525,679 | 10/1950 | Hurvitz | 325/333 |
| 3,013,209 | 12/1961 | Bickel et al. | 324/77 H |
| 3,031,528 | 4/1962 | Bolston | 324/77 F X |
| 3,593,184 | 7/1971 | Herrero | 324/77 B X |
| 3,611,298 | 10/1971 | Jacobson | 325/320 X |

*Primary Examiner*—Alfred L. Brody
*Attorney, Agent, or Firm*—Howard R. Greenberg

[57] ABSTRACT

A frequency varying electrical signal, such as an FM signal, is broken down into N pulse streams, each stream beginning with a pulse for a different successive cycle of the signal and containing a pulse for each $K(P + 1)N$ cycle thereafter, where $K$ is a consecutively increasing number beginning with the integer one and P is the number of cycles between successive pulse stream producing cycles of the signal. Each stream gives rise to a different group of pulses, each pulse having a fixed area for each pulse in its respective stream, after which the pulses from the $N$ groups are serially combined into a single pulse stream in the same order in which they are generated.

13 Claims, 3 Drawing Figures

Patented Jan. 28, 1975

3,863,161

3 Sheets-Sheet 3

DIGITAL METHOD AND APPARATUS FOR DYNAMICALLY MONITORING THE FREQUENCY OF A FREQUENCY VARYING SIGNAL

BACKGROUND OF THE INVENTION

This invention pertains generally to frequency varying electrical signals, such as FM signals, and specifically to a digital method and apparatus for dynamically monitoring the frequency of the signal to extract information therefrom as the frequency changes with time.

Frequency varying electrical signals are quite common, particularly in the electronics communication field, as represented by frequency modulation (FM) wherein a fixed amplitude sinusoidal carrier signal has its frequency altered over some bandwidth from the carrier frequency in accordance with a modulation signal applied thereto. The frequency deviation is normally designed to be a linear function of the amplitude of the modulation signal. The modulation signal is retrieved at the receiving end through the use of a frequency discriminator which provides an output whose magnitude is linearly proportional to the instantaneous frequency of the modulated carrier signal. Since the modulation process at the transmitting end is a linear operation, the modulation signal can be exactly reproduced at the receiving end by maintaining the same linear relationship between the signal frequency and magnitude of the output at the receiving end as existed at the transmitting end. Consequently linearity is an important consideration.

Furthermore, because signal levels are normally small to begin with and the quality of transmission sought is high it is important that the effects of noise be eliminated or at least minimized. Because of the development of the state of the art, most, if not all, frequency discriminators are of the analog (continuous signal) type using complex tuned circuits whose output is a linear function of the frequency of the signal input. Although digital techniques offer substantial improvements over common analog techniques in noise abatement, so important to successful frequency discrimination, as well as the elimination of the need for complex tuned circuits and the alignment problems associated therewith, these have not been fully exploited because of the problems encountered in maintaining the linear relationship which is required between the output signal and signal frequency.

One digital technique which is discussed in a paper by Ralph Glasgal, entitled "A Solid-State Ultra-Linear Wideband FM Demodulator" which appeared in the May, 1964 edition of Audio Magazine envisions the generation of a train of fixed area pulses, there being one pulse generated for each cycle of the FM signal. The rate at which these fixed area pulses are generated is a direct function of the instantaneous frequency of the FM signal. By passing the pulses through a circuit whose output is a function of the rate at which the pulses are applied thereto, it is possible to properly perform frequency discrimination. This technique has proven effective at low frequencies, but not at high frequencies because of the difficulty in generating precise are pulses, a requirement which is important for maintaining the linearity so necessary in the frequency demodulating process. At the higher frequencies encountered for FM signals (for example, carrier signals having a frequency of 70 MHz) there is not adequate time for precisely shaping the fixed area pulses. Although it would be possible to sample the FM signal so that a fixed area pulse would not be required for each and every cycle of the FM signal, this could introduce distortion into the output signal since some of the modulation information might be lost in the process, the amount of lost information, if any, being dependent on the modulation signal bandwidth.

In view of the foregoing, it is a primary object of the present invention to provide a new and improved method and apparatus for dynamically monitoring the frequency of a frequency-varying electrical signal (viz. develop a signal indicative of the instantaneous frequency of the frequency-varying signal).

It is a further object of the present invention to provide such a new and improved method and apparatus which is capable of operating at higher frequencies than presently attainable without the loss of any information contained in the varying frequency of the signal.

It is still a further object of the present invention to provide such a new and improved method and apparatus which is suited for use as a FM frequency discriminator.

These, as well as other objects of the present invention will become more readily apparent from the detailed description of the invention which follows hereinafter when read in conjunction with the appended drawings.

BRIEF DESCRIPTION OF THE INVENTION

Briefly, the invention disclosed herein entails breaking down a frequency-varying electrical signal into $N$ pulse streams, each stream beginning with a pulse for a different successive cycle of the signal and containing a pulse for each $K(P + 1)N$ cycle thereafter where $K$ is a consecutively increasing number beginning with the integer one and $P$ is the number of the cycles between pulse stream producing cycles of the signal. Each stream gives rise to a different group of pulses, each pulse having a fixed area for each pulse in its respective stream. Consequently, there are $N$ groups of fixed area pulses generated at a lower frequency than that of the signal frequency so that there is adequate time for providing the exact waveshape required for developing the precise area pulses. By serially combining the groups of pulses into a single pulse stream in the same order in which the pulses are generated, all of the original information contained in the frequency variations is retained.

The developed single stream of pulses is applied to a pulse rate monitor circuit which develops an output signal whose magnitude is directly proportional to the rate at which the pulses are received. The preferred embodiment includes the circuit details for the case wherein $P$ equals 0 and $N$ equals 2 for providing two groups of pulses having a frequency which is half that of the signal frequency.

DETAILED DESCRIPTION OF THE INVENTION

Figure 1:
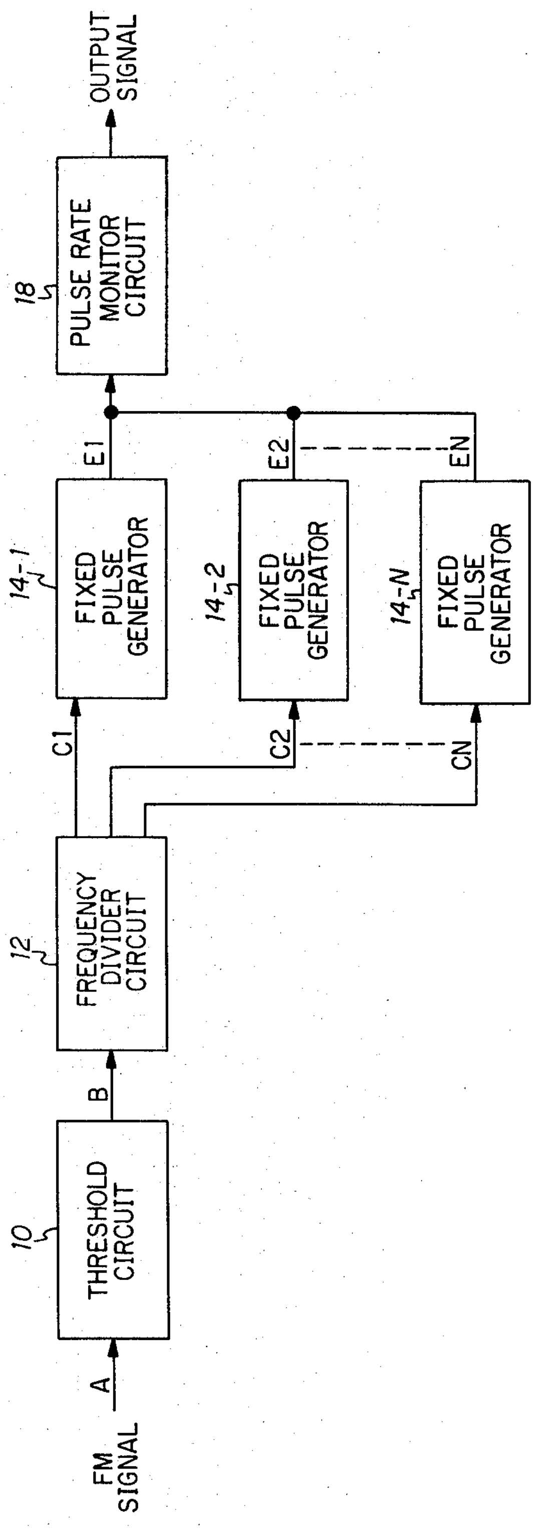
FIG. 1 is a functional block diagram which presents the invention.

As shown in FIG. 1, the invention may include a threshold circuit 10 for receiving a frequency varying sinusoidal signal, such as an FM signal (represented by waveform A of FIG. 2), in response to which it produces at its output a series of pulses (waveform B), each pulse therein being generated during a different cycle of the FM signal whenever the signal magnitude exceeds a predetermined threshold value. It should be noted that the invention is described herein in connection with an FM signal for illustrative purposes only since as will become apparent shortly it may be used with any type of frequency varying signal, for example a pulse series having pulses of different periods as would be generated at the output of threshold circuit 10. It will be noted from waveforms A and B that the frequency of the output signal produced by threshold circuit 10 is the same as the varying frequency of the input FM signal. At the high range of FM signal frequencies within which the invention may be most advantageously utilized (for example 60–80 MHz with a 70 MHz carrier and a 10 MHz bandwidth modulation signal) the pulse widths need not and probably will not coincide exactly with the times that the threshold value is in fact exceeded. There are many well known circuits, such as the Schmitt trigger circuit, which will meet the design requirements for generating this series of pulses.

Figure 2:
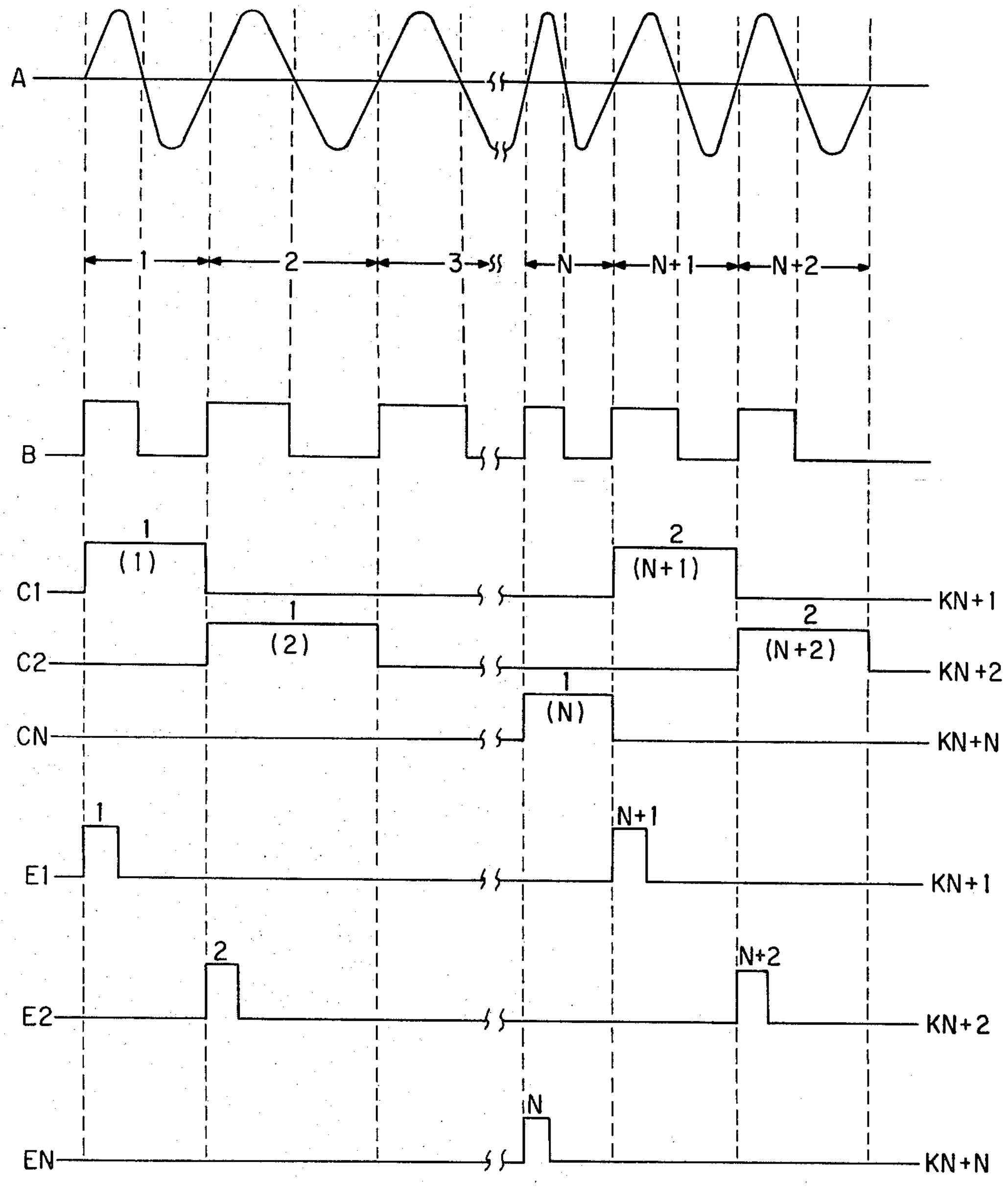
FIG. 2 is a series of waveforms which may be used in conjunction with the block diagram of FIG. 1 in understanding the invention.

The output of threshold circuit 10 is applied to a frequency divider circuit 12 which produces at its output $N$ streams of pulses (waveforms C1, C2 and CN) whose frequencies are each one $N$th that of the varying frequency of the series of pulses applied to its input (each stream has one pulse for every $N$ pulses in the pulse series). The first pulse within each stream corresponds to a different consecutive pulse of the pulse series ( and consequently a different consecutive cycle of the FM signal) which is followed by a pulse for each KN series pulse thereafter, where $K$ is a consecutively increasing number beginning with the integer one (for example, 1 for the second pulse in the pulse stream, 2 for the third pulse, etc.). Thus, the first of the $N$ pulse streams (waveform C1) provides pulses for the first, $N + 1$ ... $KN + 1$ cycles of the FM signal, while the second of the $N$ pulse streams (waveform C2) provides pulses for the second, $N + 2$ ... $KN + 2$ cycles and the last of the $N$ pulse streams (waveform CN) provides pulses for the $N$th, $N + N$, $2N + N$ ... $KN + N$ cycles. Each pulse within a stream preferably lasts at least as long as the cycle of the FM signal in which it is generated as shown in FIG. 2 and certainly not longer than the earliest time at which a second pulse in the stream is expected.

Each pulse stream (output C) of the frequency divider circuit 12 is applied to a different one of $N$ fixed pulse generator circuits 14 whose individual outputs (waveforms E1, E2 and EN) consists of a group of pulses, each pulse being generated in response to a single pulse of its respective pulse stream and having a fixed area (e.g., fixed amplitude and duration) independent of the period of the pulse triggering it. It is thus seen that a pulse having a fixed area is generated for each cycle of the FM signal, with one group of pulses (waveform E1) being produced by fixed pulse generator 14–1 for the first pulse stream (waveform C1), a second group of pulses (waveform E2) being generated by fixed pulse generator 14–2 for the second pulse stream (waveform E2) and so on through the last group of pulses (waveform EN) for the last pulse stream (waveform ON). It may be readily appreciated that by serially combining these groups of pulses into one pluse stream in the same order in which the pulses are generated so that a pulse in one group is followed by a pulse in the next consecutive group it is possible to develop a signal which is indicative of the instantaneous frequency of the FM signal because the rate at which the combined fixed area pulses are received is a linear function thereof as discussed earlier under Background of the Invention. This is performed by applying the combined pulses to a pulse rate monitor circuit 18 such as a low pass filter which produces a signal at its output whose magnitude is linearly proportional to the rate at which the pulses are received and consequently the rate of generation of the combined fixed area pulses. Since the effectiveness of this digital technique for frequency demodulation is dependent on there being a precise area under each pulse, the generation of the pulses in each of the groups at a reduced frequency provides adequate time for developing the proper wave shape of each of these pulses. It should be pointed out that although the frequency of each of the groups of pulses is one $N$th that of the FM signal, none of the modulation information is lost since the pulses are combined before extracting the information.

The duration for each group pulse is designed to be small enough with respect to the period corresponding to the highest frequency anticipated for the FM signal and the value of $N$ so that a steady state condition within each of the fixed pulse generators 14 is achieved in between the generation of pulses within the group. This ensures the rectangular waveshape of the pulses constituting waveforms E, irrespective of the frequency of FM signal, thus producing fixed area pulses for maintaining the linear relationship between the output signal produced by pulse rate monitor circuit 18 and the frequency of the FM signal.

Dependent on the ratio of the bandwidth of the modulation signal with respect to the frequency carrier signal it may not be necessary to develop a group pulse for each and every cycle of the modulated carrier FM signal to retrieve all of the modulation information. In such case one or more cycles of the FM signal can be skipped in between the cycles which trigger consecutive pulse streams so that only selected cycles actually give rise to the pulse streams. It will be readily seen that if $N$ still represents the number of pulse streams which are to be generated, and $P$ represents the number of cycles in the signal which are to be skipped between pulse stream producing cycles, then each pulse stream begins with a pulse for a different successive cycle of the signal and contains a pulse for each $K(P + 1)$ N cycle thereafter where $K$ is a consecutively increasing number starting with the integer 1. $P$ can be any number including 0 (the waveforms of figure 2 being applicable to the case for $P = 0$) dependent only on the design requirements governed by the rate of change of the modulation signal.

It may also be possible that because of the large bandwidth of a modulation signal with respect to the carrier signal frequency it is necessary to sample the FM signal more than once each cycle to retrieve all of the modulation information. This can be accomplished in the present invention merely by providing a group pulse for each half-cycle rather than for each cycle.

Thus there would be two different pulse streams for a give cycle of the FM signal with a pulse in one stream being generated during one half of the cycle and a pulse in the other stream being generated during the other half of the cycle. There could also be as many individual pulse streams as desired. If N is the total number of pulse streams to be generated from the FM signal, then each stream begins with a pulse for a different consecutive half cycle of the signal and contains a pulse for each *KN* half cycle thereafter where *K* is a consecutively increasing number starting with the integer 1.

Figure 3:
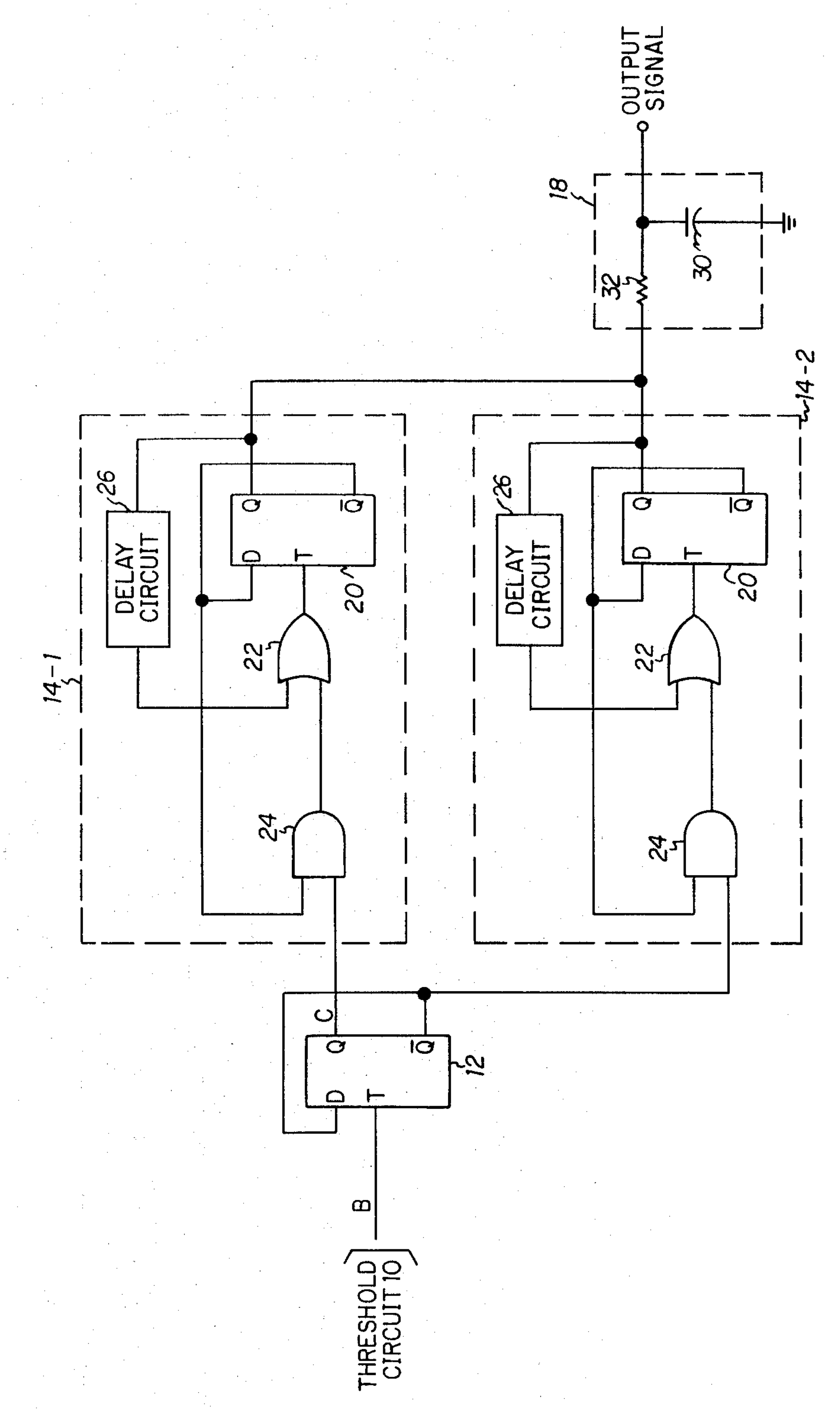
FIG. 3 provides the circuit details for one embodiment of the invention for providing two groups of pulses having a frequency which is half that of the signal frequency.

The details of the preferred embodiment for the functional elements of FIG. 1, with the exception of the threshold circuit 10, are presented in FIG. 3 where *P* equals 0 and *N* is equal to 2 for two groups of pulses obtained by dividing the FM signal frequency by half. The frequency divider circuit 12 can very simply be a D-type flip-flop wherein a transition from a low to a high state for the signal on the toggle (T) input lead transfers information on the D input lead of the flip-flop to its Q output lead. Because the input signal to the D lead is obtained from the $\overline{Q}$ output lead, each time flip-flop 12 is toggled it must change state. Thus, at the beginning of each pulse in the pulse series (waveform B), the Q output of flip-flop 12 changes state (from a logic "1" to a logic "0" or vice-versa) which lasts until the beginning of the next consecutive series pulse. At the beginning of alternate pulses in the pulse series flip-flop 12 is set while at the beginning of the other set of alternate pulses flip-flop 12 is reset.

The fixed pulse generator 14–1 is seen to also include a D-type flip-flop 20 whose toggle input T is connected to the Q output of flip-flop 12 through an OR gate 22 having an input connected to the output of an AND gate 24. The $\overline{Q}$ output of flip-flop 20 is connected to its D input lead as well as to a second input of AND gate 24. The Q output of flip-flop 20 provides a second input to OR gate 22 via a delay circuit 26 for providing a signal at its output which is the same as the signal applied to its input, but which is delayed in time by some predetermined factor which is a function of the circuit parameters. There are many well known delay circuits (e.g., an RC circuit) for affording precise control over the delay period.

In analyzing the operation of the fixed pulse genertor 14–1 let us assume that flip-flop 20 is in the reset state so that the $\overline{Q}$ output is a 1, thereby partially enabling AND gate 24. Let us further assume that the other input to AND gate 24 which is derived from the Q output of flip-flop 12 is a 0. Upon receipt of the next pulse in the pulse series (waveform B), flip-flop 12 is set so that its Q output becomes 1 thereby fully enabling AND gate 24 whose output changes from a low to a high signal. This transition is transmitted via OR gate 22 to the T input of flip-flop 20 causing it to assume its set state (1 on D lead derived from the $\overline{Q}$ output of flip-flop 20 is now transferred to its Q output). The low signal (0) now developed at the $\overline{Q}$ output of flip-flop 20 inhibits AND gate 24 so that the signal on the T input of flip-flop 20 returns to a low level. After the time delay afforded by delay circuit 26, the 1 at the Q output of flip-flop 20 is applied to OR gate 22, thereby causing another transition in the signal on the T lead of flip-flop 20 from a low to a high level causing it to assume a reset state (0 on the D lead derived from the Q output at this time is now transferred to the Q output of flip-flop 20). Flip-flop 20 remains in a reset state until flip-flop 12 is again set which will occur during the next alternate pulse in the pulse series. It is thus seen that flip-flop 20 in fixed pulse genertor 14–1 produces a pulse of fixed area since its amplitude and duration are fixed whenever flip-flop 12 is set during alternate pulses in the pulse series. The duration of the pulse is determined solely by the circuit parameters of the delay circuit 26.

The operation of fixed pulse generator 14–2, which has the same elements as fixed pulse generator 14–1 likewise numbered, is exactly the same as that just described for generator 14–1 with the exception that because the T input of its flip-flop 20 is derived from the $\overline{Q}$ output of flip-flop 12 (alternatively AND gate 24 could have its lower input connected directly to the Q output of flip-flop 12 through an inverter) flip-flop 20 produces a fixed area pulse not at the beginning of each pulse produced by flip-flop 12 at its Q output but rather at the end of said pulse or in other words whenever flip-flop 12 is reset (at the beginning of the second set of alternate pulses in the pulse series).

The pulse rate monitor circuit 18 is seen to comprise a capacitor 30 connected through a resistor 32 to the Q outputs of both flip-flops 20. This is a simple integrating circuit whose output across capacitor 30 is a function of the rate at which the pulses are applied thereto. The capacitor 30 is charge whenever either one of the flip-flops 20 is in the set state and is discharge when both flip-flops 20 are in the reset state, the appropriate charging and discharging time constants being determined by the capacitance of capacitor 30 and resistance of resistor 32 together with the different output impedances of flip-flops 20 when set and reset. It may be readily appreciated that as the rate at which fixed area pulses are applied to the pulse rate monitor circuit 18 increases as a result of an increasing frequency FM signal, the greater is the charge deposited in capacitor 30 and therefore the higher the output signal level across its plates.

The frequency discriminator described herein is thus seen to digitally provide frequency demodulation of FM signals having higher frequencies than previously attainable without the loss of any modulation information. The technique can obviously be extended to any type of frequency-varying signal besides an FM signal and furthermore N can assume any value to accommodate higher frequency signals simply by providing *N* fixed pulse generators and a suitable frequency divider circuit for generating the *N* pulse streams. If the bandwidth of the modulation signal respective to the carrier signal frequency does not necessitate a pulse for each and every cycle of the FM signal the *P* can be changed from 0 to any suitable value through any one of well known counting techniques. Frequency divider circuits for different values of *N* and *P* are either presently available commercially or could easily be designed using known logic elements by anyone having ordinary skill in the art. Since various modifications to the foregoing detailed description which would not depart from the scope and spirit of the invention are undoubtedly possible, the preferred embodiment described herein is intended to be merely exemplary and not restrictive of the invention as claimed hereinbelow.

What is claimed is:

1. Apparatus for dynamically monitoring the frequency of a frequency-varying sinusoidal signal, comprising:

threshold circuit means for receiving the sinusoidal signal and providing in response thereto a series of pulses, each pulse being generated during a different cycle of the signal whenever the signal magnitude exceeds a predetermined threshold value;

frequency divider circuit means for providing $N$ streams of pulses in response to said series of pulses, each pulse stream having a pulse for a different successive one of the pulses in said series and containing a pulse for each $K(P + 1)N$ series pulse thereafter where $K$ is a consecutively increasing number starting with the integer 1 and $P$ equals the number of series pulses in between successive pulse stream producing series pulses; and pulse generating circuit means for providing $N$ groups of pulses, each group being generated in response to a different one of said pulse streams and containing a fixed area pulse for each pulse in its corresponding stream and serially combining said groups of pulses into a single pulse stream in the same order in which they were generated.

2. The apparatus of claim 1 where $P$ is 0.

3. The apparatus of claim 2 wherein $N$ is 2 and pulses in one of said pulse groups are generated in response to the leading edge and pulses in the other group are generated in response to the trailing edge of pulses in one of the two pulse streams.

4. The apparatus of claim 1 including a pulse rate monitor circuit for providing an output signal whose magnitude in a linear function of the rate at which pulses in said single pulse stream are received at its input.

5. Apparatus for dynamically monitoring the frequency of a frequency-varying signal comprising:

frequency divider circuit means for providing $N$ streams of pulses in reponse to the signal, each pulse stream having a pulse for a different successive one of the cycles of the signal and containing a pulse for each $K(P + 1)\ N$ cycle thereafter where $K$ is a consecutively increasing number starting with the integer 1 and $P$ equals the number of cycles between successive pulse stream producing cycles; and pulse generating circuit means for providing $N$ groups of pulses, each group being generated in response to a different one of said pulse streams and containing a fixed area pulse for each pulse in its correpsonding stream and serially combining said groups of pulses into a single pulse stream in the same order in which they were generated.

6. The apparatus of claim 5 wherein $P$ is 0.

7. The apparatus of claim 6 wherein $N$ is 2 and pulses in one of said pulse groups are generated in response to the leading edge and pulses in the other group are generated in response to the trailing edge of pulses in one of the two pulse streams.

8. The apparatus of claim 5 including pulse rate monitor circuit means for providing an output signal whose magnitude is a linear function of the rate at which pulses in said single pulse stream are received at its input.

9. A method of dynamically monitoring the frequency of a frequency-varying electrical signal comprising:

generating $N$ pulse stream from the electrical signal, each stream beginning with a pulse for a different successive cycle of the signal and containing a pulse for each $K(P + 1)N$ cycle thereafter where $K$ is a consecutively increasing number starting with the integer 1 and $P$ equals the number of cycles between successive pulse stream producing cycles; and generating and serially combining into a single pulse stream in the same order in which they are generated fixed area pulses distributed in $N$ group wherein each group is associated with a different one of said $N$ streams and contains a fixed area pulse for each pulse in its associated stream.

10. The method of claim 9 wherein $P$ is 0.

11. The method of claim 9 including applying said single pulse stream to a pulse rate monitor circuit to develop a signal whose magnitude is a function of the rate at which pulses are received.

12. Apparatus for dynamically monitoring the frequency of a frequency-varying signal comprising:

frequency divider circuit means for providing $N$ streams of pulses in response to the signal each pulse stream having a pulse for a different consecutive one of the half-cycles of the signal and containing a pulse for each $KN$ half-cycle thereafter where $K$ is a consecutively increasing number starting with the integer one; and pulse generating circuit means for providing $N$ groups of pulses, each group being generated in response to a different one of said pulse streams and containing a fixed area pulse foar each pulse in its corresponding stream and serially combining said groups of pulses into a single pulse stream in the same order in which they were generated.

13. A method of dynamically monitoring the frequency of a frequency-varying electrical signal comprising:

generating $N$ pulse streams from the electrical signal, each stream beginning with a pulse for a different consecutive half-cycle of the signal and containing a pulse for each $Kn$ half-cycle thereafter where $K$ is a consecutively increasing number starting with the integer one; and generating and serially combining into a single pulse stream in the same order in which they are generated fixed area pulses distributed in $N$ groups wherein each group is associated with a different one of said $N$ streams and contains a fixed area pulse for each pulse in its associated streams.

* * * * *